United States Patent [19]

Sellars

[11] Patent Number: 4,546,395
[45] Date of Patent: Oct. 8, 1985

[54] DIFFERENTIAL SIGNAL DECODERS

[75] Inventor: Graham P. Sellars, Winsford, England

[73] Assignee: Burroughs Corporation, Detroit, Mich.

[21] Appl. No.: 447,833

[22] Filed: Dec. 8, 1982

[30] Foreign Application Priority Data

Dec. 11, 1981 [GB] United Kingdom ............... 8137549

[51] Int. Cl.[4] .................... G11B 21/10; G11B 5/02
[52] U.S. Cl. ........................................ 360/77; 360/29
[58] Field of Search ................ 360/77, 29; 318/619; 329/131

[56] References Cited

U.S. PATENT DOCUMENTS 4,380,034 4/1983 Krake .................................. 360/77
4,412,165 10/1983 Case et al. .......................... 360/77

Primary Examiner—Vincent P. Canney
Attorney, Agent, or Firm—Mark T. Starr; Kevin R. Peterson

[57] ABSTRACT

A self-scaling differential signal decoder which accepts first and second input signals and provides an output representative of the difference therebetween which output is scaled as if the sum of the input signals were equal to a predetermined value, avoids the problems associated with slow AGC control circuits and with operational sequence control systems commonly used in such devices and is operable at up to video speeds by exploiting the properties of a transistor differential long-tail-pair amplifier where the ratio between its output currents is proportional to the antilogarithm of the difference between its input voltages, the sum of the output currents is equal to the controlled value of the constant current source and the input to the long-tail pair is provided by a differential logarithmic amplifier, the decoder being employed in a tribit servo-track reader.

12 Claims, 9 Drawing Figures

DIFFERENTIAL SIGNAL DECODERS

We hereby claim foreign priority benefits under Title 35, U.S. Code, Section 119 of United Kingdom Application No. 81-37549, filed Dec. 11, 1981.

BACKGROUND TO THE INVENTION

1. The Field of the Invention

The present invention relates to differential signal decoders wherein an output is provided representative of the difference between two input signals according to a predetermined scale factor. It particularly relates to differential signal decoders wherein the output is scaled such that the sum of the input signals is effectively a predetermined constant value. In greatest particularity the present invention relates to decoders for recorded servo signals on moving data storage media operable to give an output signal indicative of the displacement of a transducer from being centrally disposed over the servo track by taking the difference between two position-indicating signals recorded on the medium.

While the present invention is hereafter described in relation to the decoding of servo signals recovered from a moving data storage medium, it is to be appreciated that this application is intended to be merely illustrative of one field of use of the invention and does not constitute a limitation to its utility.

2. The Prior Art

Numerous schemes exist for recording servo tracks on a moving data storage medium. The medium is popularly disc or tape and the servo tracks are used to indicate the displacement of a signal-recovering transducer from being centrally disposed thereover by decoding the servo signal recovered from the medium by the transducer. The output of the servo signal decoder can then be used either to set up some initial position of the transducer relative to the medium or continously during the operation of the data storage equipment to provide a position feedback signal for a transducer-positioning servomechanism to control the position of the transducer relative to the medium.

The nature of the servo signals involves first and second signal components which increase and decrease respectively as the transducer moves away from central disposition over the servo track in a first direction and decrease and increase respectively as the transducer moves away from central disposition over the servo track in a second direction. The difference between the first and second components is used to indicate by magnitude and sense the magnitude and direction of the displacement of the transducer away from being centrally disposed over the servo track. It is a problem that the amplitude of the signals recovered from the medium is uncertain and that, in order for the output of a servo signal decoder to be consistent in its magnitude, scaling means must be included for compensating for or for eliminating the effects of collective amplitude variation by the first and second signal components.

In one scheme the output of the transducer is provided as the input to a gain-controlled amplifier. The output of the gain-controlled amplifier is provided as the input to a measuring circuit which measures the amplitudes of the first and second signal components, sums them and subtracts the sum from a reference level. The result of the substraction is used as the gain controlling input to the gain controlled amplifier which thereby acts to maintain the sum of the first and second signal components equal to the reference level and so stabilize the scaling of the difference therebetween. This scheme has the disadvantage that the speed of the gain-controlled amplifier is slow and requires a considerable period of servo signals being present for the described, stabilized condition to be established. It is the trend that servo information is included in short segments among data. Such a slow scheme would not work on the short blocks of servo signals.

In another scheme the magnitudes of the first and second components are stored on first and second capacitors respectively which are discharged with the same time constant, the sum of the voltages on the capacitors being compared against a reference and a sample and hold circuit being triggered to acquire and hold the difference between the voltages on the capacitors at the instant the sum of the voltages equals the reference. This requires the inclusion of a controller for supervising the above actions and also requires that the time constants of the discharging of the two capacitors are closely matched, which can be a difficult task given the variation in values encountered among manufactured capacitors of nominally the same value.

One very common type of servo track is the so-called tribit track described by Meuller in U.S. Pat. No. 3,691,543 wherein two contiguous adjacent subtracks are recorded on a magnetic data storage disc. Both subtracks share a common magnetic flux transition of a first sense. The first subtrack thereafter has its own individual flux transition of a second sense and thereafter the second subtrack has its own flux transition of the second sense. When read back by a replay head, the common transition of the first sense produces a first timing pulse of a first polarity followed by a first position pulse of the opposite polarity caused by the individual transition of the first subtrack. Thereafter the individual transition of the second subtrack causes a second position pulse of the same polarity as the first position pulse. The relative amplitudes of the first and second position pulses depends upon the proportion of the width of the head disposed over each subtrack and the difference in their amplitudes is therefore indicative of the displacement of the head from being equally disposed over each subtrack.

Whereas the invention is hereafter described with reference to use with so-called tribit signals, it is to be appreciated that this is merely illustrative of one manner of use in one of many possible fields of application.

It is therefore desirable to provide a signal decoder which is operable at high speed without the necessity for complicated control sequences for automatically providing an output proportional to the difference between two input signals scaled as if the sum of the two input signals were equal to a predetermined value regardlessly of their actual sum. It is further desirable that means be provided for operating such a decoder for decoding servo signals recovered from a moving medium by a transducer. It is yet further a desirable feature that those signals be so-called tribit signals.

SUMMARY OF THE INVENTION

According to a first aspect, the present invention consists in a differential signal decoder comprising a logarithmic convertor coupled to receive first and second input signals and to provide a logarithmic output signal proportional to the ratio between said first and second input signals and an antilogarithmic convertor coupled to receive said logarithmic output signal as an input and operable to respond thereto to control first and second final output signals such that the ratio between said first and second final output signals is the same as the ratio between said first and second input signals and the sum of said first and second final output signals is equal to a predetermined value, the difference between said first and second final output signals being provided as the output of said differential signal decoder.

According to another aspect, the present invention consists in a reader for servo signals recovered from a moving medium by a transducer, said reader comprising a differential signal decoder coupled to receive first and second input signals indicative of the position of said transducer relative to a median position, said decoder comprising; a logarithmic converter operable to provide a logarithmic output signal proportional to the ratio between said first and second input signals and an antilogarithmic convertor coupled to receive said logarithmic output signal and operable to respond thereto to control first and second final output signals such that the ration between said first and second final output signals is the same as the ratio between said first and second input signals and the sum of said first and second final output signals is equal to a predetermined value, the difference between said first and second final output signals being provided as the output of said reader.

A tribit signal is hereafter defined as a signal recoverable from a tribit track on a moving medium by a transducer comprising a timing pulse of a first polarity, a first position-indicating pulse of a second polarity opposite to that of the timing pulse and a second position-indicating pulse of the same polarity as the first position-indicating pulse following said first position indicating pulse, the position of said transducer relative to a median position being indicated by the proportional difference between the magnitudes of said first and second position-indicating pulses.

Therefore, according to another aspect, the present invention consists in a reader for tribit signals comprising a first peak-and-hold circuit for receiving a tribit signal and for providing an output representative of the magnitude of the first position indicating pulse, a second peak-and-hold circuit coupled to receive said tribit signal and operable to provide an output representative of the magnitude of the second position indicating pulse, and a differential signal decoder coupled to receive said output signals of said first and second peak-and-hold circuits as first and second input signals respectively, said decoder comprising a logarithmic converter operable to provide a logarithmic output signal proportional to the logarithm of the ratio between said first and second input signals and an antilogarithmic convertor coupled to receive said logarithmic output signal as an input and operable to respond thereto to control first and second final output signals such that the ratio between said first and second final output signals is the same as the ratio between said first and said second input signals and the sum of said first and second final output signals is equal to a predetermined value, the difference between said first and second final output signals being provided as the output of said reader.

BRIEF DESCRIPTION OF THE PREFERRED EMBODIMENTS

In a preferred embodiment a differential signal decoder preferably comprises first and second logarithmic amplifiers, in which case each amplifier preferably comprises a transistor and an operational amplifier coupled with the transistor in the negative feedback path of the operational amplifier such that the output of the operational amplifier changes in response to an increment of input voltage by an amount proportional to the logarithm of the input increment.

The first and second logarithmic amplifiers are preferably in receipt of first and second input signals and the outputs of the first and second logarithmic amplifiers are preferably provided as the inputs to a a differential long-tail-pair transistor circuit wherein two junction transistors share a common current source on their emitters, input signals are provided at their respective bases, and the difference between their collector signals is provided as the output. The long-tail-pair preferably provides the output to the decoder.

The decoder is preferably employed in a tribit signal reader, in which case the decoder acts as a scaling circuit. The reader preferably comprises first and second peak-and-hold circuit for acquiring and maintaining an output representative of the magnitudes of the first and second position indicating peaks of the tribit signal. The outputs of the first and second peak-and-hold circuits are preferably provided as the first and second input signals respectively to the decoder. The output of the decoder is preferably provided as the output of the reader.

The reader preferably comprises a timing peak detector for providing an output indicative of the receipt of the timing peak of the tribit signal. The output of the timing peak detector is preferably provided as the input to a window generator. The window generator preferably responds to the output of the timing peak detector by generating a first window signal for coupling to the first peak-and-hold circuit and operable to activate the first peak-and-hold circuit during the time when the first position-indicating tribit peak arrives and by generating a second window signal for coupling to the second peak-and-hold circuit and operable to activate the second peak-and-hold circuit during the time when the second position-indicating peak of the tribit signal arrives. The window generator preferably comprises first and second timers for generating the first and second window signals.

BRIEF DESCRIPTION OF THE DRAWINGS

The invention is further explained, by way of an example, by the following description in conjunction with the appended drawings, in which.

DETAILED DESCRIPTION OF THE PREFERRED EMBODIMENT

Figure 1:
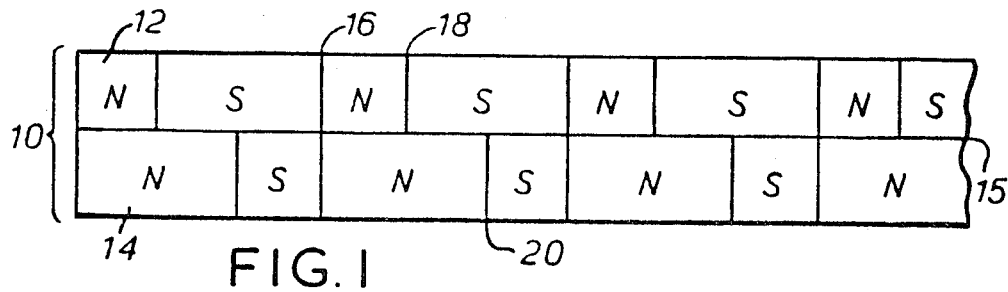
FIG. 1 shows the pattern of magnetization found in a so-called tribit servo track.

FIG. 1 shows the magnetization pattern of a tribit track.

The tribit track 10 comprises a first sub-track 12 and a second sub-track 14 contiguous to one another along a median line 15. Each sub-track 12, 14 comprises areas of a first polarity of magnetization N and areas of a second polarity of magnetization S. The boundaries between the areas of first magnetization polarity N and second magnetization polarity S are perpendicular to the median line 15. A common boundary 16 is formed by the coincidence of the change between an area of second magnetization polarity S to an area of first magnetization polarity N in both the first sub-track 12 and the second sub-track 14. A first position indicating boundary 18 is formed by the transition from the first polarity of magnetization N to the second polarity of magnetization S in the first sub-track 12. A second position indicating boundary 20 is formed by the transition from the first polarity of magnetization N to the second polarity of magnetization S in the second sub-track 14.

In FIG. 1 and in the subsequent description the tribit track 10 is shown as comprising repeated tribit patterns where each pattern consists in a common boundary 16 followed by a first position indicating boundary 18 and thereafter a second position indicating boundary 20. It is to be appreciated that the track 10 can consist in a single tribit pattern among data signals for track-on-data purposes and similarly can consist in a finite or infinite concatination of tribit patterns such as might be recovered from a reference track on a magnetic tape or a magnetic disc respectively.

As stated above, the track 10 can be recorded on magnetic tape or magnetic disc. This does not constitute a limitation upon its use. Those skilled in the art will readily perceive how such a track can be laid down on optical and other types of recording media.

For the purposes of the following description it is immaterial as to whether the track 10 is on disc or tape. In either case it is to be assumed that the medium is moving towards the left of FIG. 1 with constant speed. Any transducer will then encounter the common boundary 16, the first position indicating boundary 18 and the second position indicating boundary 20 in that order. It will be apparent from the following description how the invention is able to be modified to accommodate median movement in the other direction and to cope with non-constant medium speed.

Figure 2A:
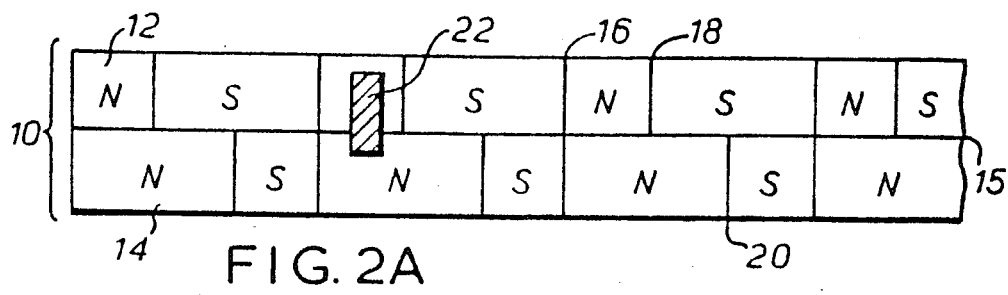
FIGS. 2A to 2C show a signal recovering transducer in three different positions relative to the tribit track of FIG. 1.
Figure 2B:
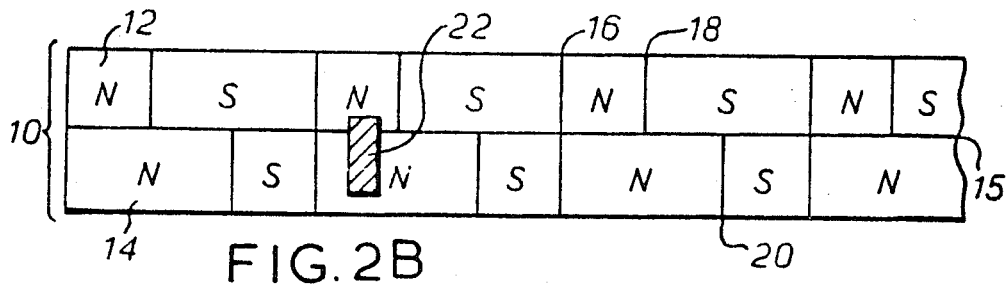
Figure 2C:
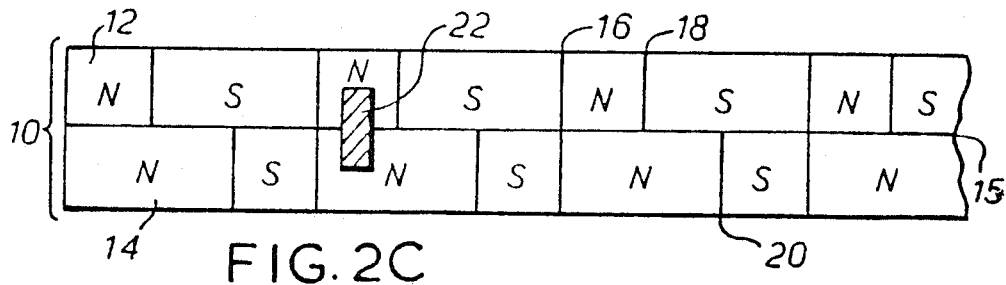

FIGS. 2A, 2B and 2C show three illustrative positions of a transducer recovering signals from the tribit track 10.

FIG. 2A shows a transducer 22 disposed such that it is more interactive with the first sub-track 12 than with the second sub-track 14. The transducer 22 shown is representative of the magnetic gap of a magnetic transducer in a disc or tape store. When the medium is other than magnetic it is to be appreciated that the transducer 22 as shown can be taken as representative of the zone of interaction of a signal-recovering device with whatever medium is used. By being disposed with more of its area over the first sub-track 12 than over the second sub-track 14 the transducer 22 picks up a greater proportion of its signal from the first sub-track 12 than it does from its second sub-track 14.

FIG. 2B shows the transducer 22 disposed with a greater proportion of its area over the second sub-track 14 than over the first sub-track 12. The transducer 22 therefore acquires a greater proportion of its recovered signal from the second sub-track 14 than from the first sub-track 12.

FIG. 2C shows the transducer 22 equally disposed across the median line 15 to have equal areas on both the first sub-track 12 and the second sub-track 14. The transducer 22 therefore acquires equal proportions of its recovered signal from both the first sub-track 12 and the second sub-track 14.

Figure 3A:
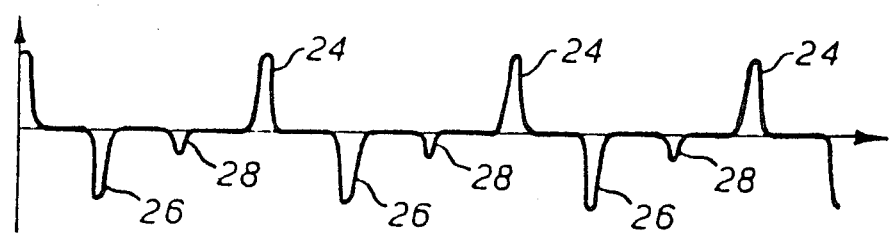
FIGS. 3A to 3C show the output signals recovered by the transducer in each of the positions of FIGS. 2A to 2C respectively.
Figure 3B:
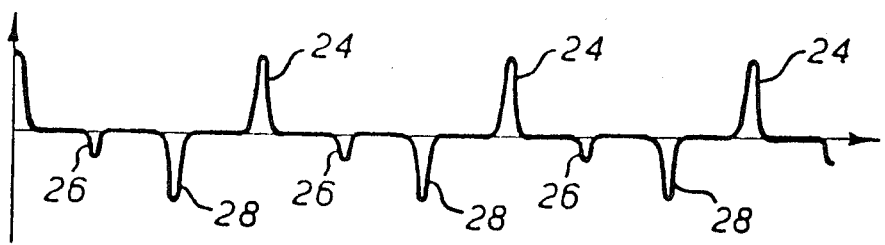
Figure 3C:
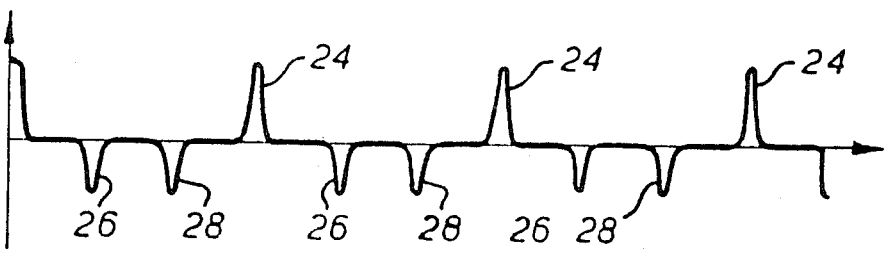

FIGS. 3A, 3B and 3C show the waveform recovered by the transducer 22 from the tribit track 10 when in each of the positions illustrated in FIGS. 2A, 2B and 2C respectively.

Whenever a change in the sense of the polarity of magnetization on the medium passes beneath the transducer 22 the transducer 22 responds thereto by producing an ouput pulse. The polarity of the pulse depends upon the direction of the encountered change in magnetization polarity. In the following description it is taken that a change from the first sense of magnetization N to the second sense of magnetization S produces a negative pulse while a change from the second sense of magnetization S to the first sense of magnetization N produces a positive pulse. It will readily be appreciated that the opposite polarity of pulses produced by the transducer 22 in response to magnetization changes can equally apply with obvious changes in the apparatus to be described. The magnitude of the pulses depends upon the proportion of the width of the transducer 22 that the magnetization change causing the pulse occupies. Maximum amplitude is achieved when the magnetization change extends across the entire width of the transducer 22, the magnitude of each pulse decreasing as a proportion of the maximum amplitude in proportion to the proportional part of the width of the transducer 22 that the magnetization change occupies.

FIG. 3A shows the signal recovered by the transducer 22 when in the position illustrated in FIG. 2A.

As the common boundary 16 passes beneath the transducer 22 it causes the transducer to produce the timing 24 of positive polarity. Thereafter the first position indicating boundary 18 passes beneath the transducer 22 causing it to provide a first position indicating pulse 26. The later passage beneath the transducer 22 of the second position indicating boundary 20 causes it to produce a second position indicating pulse 28.

The transducer 22 is narrower than the tribit track 10. The common boundary 16 extends across the entire width of the tribit track 10 and so it is immaterial to the magnitude of the timing pulse 24 whereabouts on the track 10 the transducer 22 is situated since the common boundary 16 always extends across the entire width of the transducer 22, to make the timing pulse 24 of the maximum amplitude.

The transducer 22 is disposed with a greater proportion of its width over the first sub-track 12 than over the second sub-track 14. The magnitude of the first position indicating pulse 26 is therefore greater than the magnitude of the second position indicating pulse 28 and their sum is equal to the magnitude of the timing pulse 24.

FIG. 3B shows the output waveform of the transducer 22 when it is disposed relatively to the median line 15 as illustrated by FIG. 2B.

In this case the transducer 22 is disposed with a greater proportion of its width over the second sub-track 14 than over the first sub-track 12. The timing pulse 24 is at the maximum amplitude as before. The first position indicating pulse 26 is smaller than the second position indicating pulse 28 and their sum is once again equal to the magnitude of the timing pulse 24.

FIG. 3C shows the output waveform of the transducer 22 when it is disposed as illustrated by FIG. 2C.

The timing pulse 24 is at maximum amplitude as before. The transducer 22 is equally disposed over the median line 15 such that half of its width lies over the first sub-track 12 and half of its width lies over the second sub-track 14. The first position indicating pulse 26 and the second position indicating pulse 28 are therefore equal in amplitude and both equal to half the magnitude of the timing pulse 24.

It will be appreciated that the alterations in relative amplitudes between the first and second position indicating pulses 26, 28 are continous with the position of the transducer 22 ranging from the first position indicating pulse 26 having maximum amplitude and the second position indicating pulse 28 having zero amplitude when the transducer 22 is entirely over the first sub-track 12, to the first position-indicating pulse 26 having zero amplitude and the second position-indicating pulse 28 having maximum amplitude when the transducer 22 is entirely over the second sub-track 14. The amplitudes of the position indicating pulses 26, 28 are therefore indicative of the position of the transducer 22 and the difference therebetween gives by magnitude and polarity a measure of the displacement of the transducer 22 from being centrally disposed over the median line 15, in terms of the size of the displacement and its direction.

Figure 4:
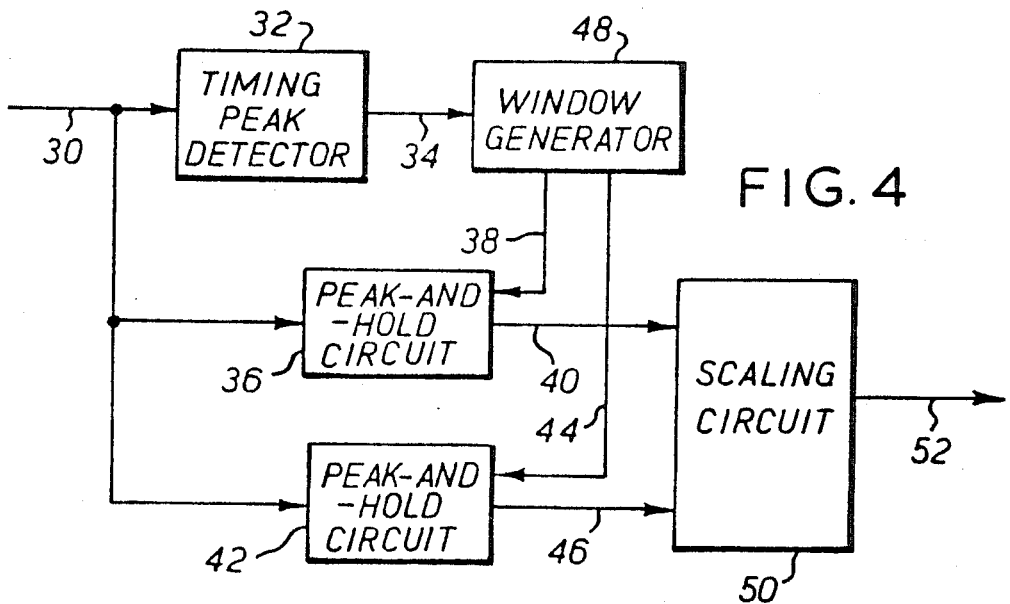
FIG. 4 shows a schematic block diagram of the tribit signal reader.

FIG. 4 shows a schematic diagram of the preferred embodiment of the tribit signal reader.

The tribit signal, as depicted in FIG. 3A to 3C, is firstly provided as the input, on a signal input line 30, to a timing peak detector 32. The timing peak detector 32 responds to the positive timing pulse 24 of the tribit signal by providing a short, logic output pulse at each instance thereof on a pulse output line 34.

The signal input line 30 is also employed to couple the tribit signal as an input to a first peak-and-hold circuit 36. The first peak-and-hold circuit 36 is operable in response to an enabling command from an enabling line 38 to acquire, store, and provide as output on an output line 40 the peak value of tribit signal which it receives during the time it is enabled.

The signal input line 30 is finally employed to couple the tribit signal as the input to a second peak-and-hold circuit 42. The second peak-and-hold circuit 42 is operable in response to an enabling signal on an enabling input line 44 to acquire, store and provide as output on an output line 46 the peak value of the tribit signal which it received during the time it is enabled.

The signal from the timing peak detector 32 on the pulse ouput line 34 is coupled as the triggering input to a window generator 48. In response to each indication from the timing peak detector 32 the window generator 48 starts a timing circuit for providing the enabling signal on the enabling line 38 to the first peak-and-hold circuit 36 during the time when the first position indicating pulse 26 is expected to arrive and for providing the enabling signal on the enabling line 44 to the second peak-and-hold circuit 42 during the time when the second position indicating pulse 28 is expected to arrive.

In this manner the outputs of the first and second peak-and-hold circuits 36, 42 are made to represent the peak values of the first and second position indicating pulses 26, 28 respectively.

There is of course a problem that the transducer 22 which recovers the tribit signal from the moving medium can vary in sensitivity with medium velocity, time, temperature and a host of other causes, rendering the sum of the amplitudes of the position indicating pulses 26, 28 uncertain and therefore rendering the difference therebetween an uncertainly-scaled representation of the departure of the transducer 22 from being centrally disposed over the servo track 10.

Accordingly, the output of the first peak-and-hold circuit 36 on the first peak-and-hold output line 40 is coupled as a first input to a scaling circuit 50 and the output of the second peak-and-hold circuit 42 on the second peak-and-hold output line 46 is coupled as a second input to the scaling circuit 50. The scaling circuit 50 provides an automatically scaled output on the reader output coupling 52.

Figure 5:
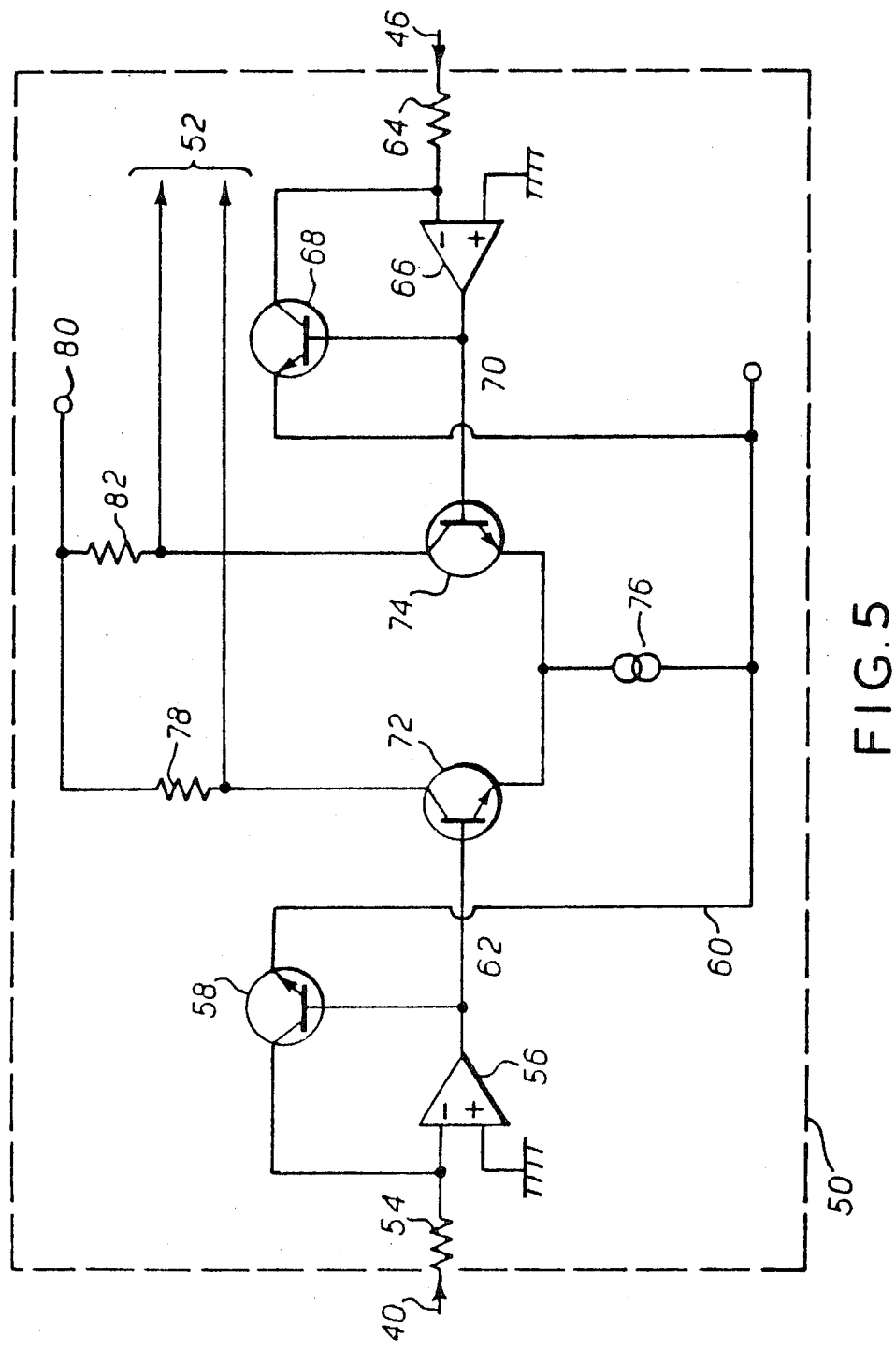
FIG. 5 shows the scaling circuit of FIG. 4, being the differential signal decoder of the present invention.

FIG. 5 shows a schematic diagram of the scaling circuit 50 of FIG. 4, being the differential signal decoder of the present invention.

The output from the first peak-and-hold circuit 36 is coupled via the first peak-and-hold line 40 and via a first input resistor 54 to the inverting input of a first operational amplifier 56 the non-inverting input of which is grounded. The base of a first transistor 58 is coupled to the output of the first operational amplifier 56 and the collector of the first transistor 58 is coupled to the inverting input of the first operational amplifier 56. The emitter of the first transistor 58 is connected to a negative supply rail 60 which serves to keep the first transistor actively biased. The first operational amplifer 56 and the first transistor 58 are thereby connected to serve as a first logarithmic amplifier such that the output voltage of the first operational amplifier 56 is in proportion to the logarithm of the output of the first peak-and-hold circuit 36.

The output from the second peak-and-hold circuit 42 is coupled via the second peak-and-hold line 46 and via a second resistor 64 to the inverting input of a second operational amplifier 66 the non-inverting input of which is grounded. The base of the second transistor 68 is coupled to the output of the second operational amplifier 66 and the collector of the second transistor 68 is coupled to the inverting input of the second operational amplifier 66. The emitter of the second transistor 68 is connected to the negative supply rail 60 which serves to keep the second transistor 68 actively biased. The second operational amplifier 66 and the second transistor 68 are thereby connected to serve as a second logarithmic amplifier such that the output voltage of the second operational amplifier 66 is proportional to the logarithm of the output voltage of the second peak-and-hold circuit 42.

The first and second resistors 54, 64 are equal in value. The difference between the output voltage of the first and second operational amplifiers 56, 66 is therefore proportional to the logarithm of the ratio between the output voltage of the first peak-and-hold circuit 36 and the output voltage of the second peak-and-hold circuit 42.

A third transistor 72, a fourth transistor 74 and a constant current source 76 make up a long-tail-pair differential amplifier. The emitter of the third transistor 72 is connected to the emitter of the fourth transistor 74. The constant current source 76 connects the emitters of the third and fourth transistors 72, 74 to the negative supply rail 60. The collector of the third transistor 72 is connected via a first load resistor 78 to a positive supply rail 80 and the collector of the fourth transistor 74 is connected via a second load resistor 82 to the positive supply rail 80. The value of the second load resistor 82 is the same as the value of the first load resistor 78.

The output of the first operational amplifier 56 is coupled as the input to the base of the third transistor 72 and the output of the second operational amplifier 66 is coupled as the input to the fourth transistor 74.

The constant current source 76 can be of any kind known in the art. It can range from a plural transistor circuit to a very high value resistor, dependently upon the desired operating current and the available voltage on the negative supply rail 60.

The ratio of the current flowing in the collectors of the third and fourth transistors 72, 74 is proportional to the antilogarithm of the difference between the voltage presented to the base of the third transistor 72 and the voltage presented to the base of the fourth transistor 74. The sum of the currents flowing in the collectors of the third and fourth transistors 72, 74 is constrained by the constant current source 76 to be equal to the controlled current of the source 76.

Whereas it has been shown that the difference between the output voltage of the first operational amplifier 56 and the output voltage of the second operational amplifier 66 is proportional to the logarithm of the ratio of the output voltages of the first and second peak-and-hold circuits 36, 42 and that the inputs of the differential long-tail pair being provided from the outputs of the first operational amplifier 56 and the second operational amplifier 66, the ratio of the collector currents in the long tail pair is proportional to the antilogarithm of the differential input voltage to the differential long-tail pair amplifier. It becomes clear that the ratio of the currents in the collectors of the third and fourth transistors 72, 74 is equal to the ratio of the voltages presented on the first peak-and-hold line 40 and the second peak-and-hold line 46 respectively. Hoewver, because the sum of the currents in the collectors of the third and fourth transistors 72, 74 is constrained by the constant current source 76 to be equal to a predetermined value, the input voltages presented on the first peak-and-hold line 40 and the second peak-and-hold line 46 are effectively scaled such that their sum is apparently constant regardless of their actual sum. The difference between the collector voltage of the third and fourth transistors 72, 74, as generated by voltage drop from the positive supply rail 80 by the first and second load resistors 78, 82 respectively, is provided on the output coupling 52 as the output of the tribit reader, the difference therebetween being representative of the difference in amplitudes of the first and second position indicating pulses 26, 28 scaled as if their sum were equal to a predetermined value.

The automatically-scaling differential signal decoder 50 as described and illustrated in FIG. 5 has many applications other than the decoding of recorded servo signals. It can be used for the feedforward automatic gain control of any kind of differential signal. It can be used in any kind of servo signal environment, for example for scaling the signals recovered from two radar dishes when steering a radar array onto a target whose direction is intermediate between the directions of point of the two dishes.

What I claim is:

1. A demodulator for demodulating servo signals recovered from a moving medium by a transducer wherein the direction and distance of displacement from central disposition over the medium of the transducer is indicated by the sense and magnitude of the difference between first and second position indicating signals recovered from the medium by the transducer and scaled as if their sum were equal to a predetermined value, said demodulator including a first detector in receipt of said first position-indicating signal from said transducer and operable to provide an output indicative of the the magnitude thereof and a second detector in receipt of said second position-indicating signal from said transducer and operable to provide an output indicative of the magnitude thereof, said demodulator comprising;
   a differential signal decoder comprising;
   a logarithmic converter coupled to receive said outputs of said first and second detectors as respective first and second input signals and operable to provide a logarithmic output signal proportional to the logarithm of the ratio between said first and second input signals, and
   an antilogarithmic converter coupled to receive said logarithmic output signal and operable to respond thereto to control first and second convertor output signals for the ratio therebetween to be equal to the ratio between said first and second input signals and for the sum of said first and second converter output signals to be equal to said predetermined value, where,
   the difference between said first and second convertor output signals is coupled as the output of said demodulator.

2. A demodulator according to claim 1 wherein said antilogarithmic convertor comprises;
   a long-tail pair differential amplifier comprising;
   first and second bipolar transistors comprising respectively first and second emitters, first and second bases and first and second collectors, said first and second emitters being connected together, and
   a constant current source coupled intermediately between said commonly-connected emitters and a first supply rail, where
   said logarithmic output signal is coupled differentially between said first and second bases, and where
   said first collector is coupled to pass a first collector current to a second supply rail and said second collector is coupled to pass a second collector current to said second supply rail, whereby
   the ratio between said first and second collector currents is proportional to the antilogarithm of said logarithmic output signal, and whereby
   the sum of said first and second collector currents is constrained to be equal to the value of current passed by said constant current source.

3. A demodulator according to claim 2 comprising;
   a first matched impedance coupled intermediately between said first collector and said second supply rail, and
   a second matched impedance coupled intermediately between said second collector and said second supply rail, where
   the common value of said first and second matched impedances is such that the sum of the voltage drops thereacross in consequence of the flow therethrough of said first and second collector currents is equal to said predetermined value.

4. A demodulator according to claim 1 wherein said logarithmic convertor comprises;
   a first logarithmic generator coupled to receive said output of said first detector and operable to provide a first logarithmic generator output signal proportional to the logarithm thereof, and,
   a second logarithmic generator coupled to receive said output of said second detector and operable to provide a second logarithmic generator output signal, where the difference between said first logarithmic generator output signal and said second logarithmic generator output signal is provided as said logarithmic output signal.

5. A demodulator according to claim 4 wherein said first logarithmic generator comprises a first current generator operable to provide a first generator current in proportion to said first input signal, and, a first forward-biased diode wherethrough said first generator current is passed, where the voltage generated across said first diode is provided as said first logarithmic generator output signal, and wherein said second logarithmic generator comprises a second current generator operable to provide a second generator current in proportion to said second input signal, and a second forward-biased diode wherethrough said second generator current is passed, where the voltage generated across said second diode is provided as said second logarithmic generator output signal.

6. A demodulator according to claim 5 wherein said first current generator comprises a first operational amplifier with said first diode coupled in the feedback path intermediately between the output of said first operational amplifier and the inverting input of said first operational amplifier, and wherein said second current generator comprises a second operational amplifier with said second diode coupled in the feedback path intermediately between the output of said second operational amplifier and the inverting input of said second operational amplifier, where said output of said first detector is coupled to said inverting input of said first operational amplifier through a first matched resistor, and where said output of said second detector is coupled to said inverting input of said second operational amplifier through a second matched resistor.

7. A demodulator according to claim 6 wherein said first diode comprises the base-collector junction of an actively-biased first logarithmic amplifier transistor, and wherein said second diode comprises the base-collector junction of an actively-biased second logarithmic amplifier transistor.

8. A demodulator according to claim 1 wherein said logarithmic convertor comprises;

a first logarithmic generator coupled to receive said output of said first detector and operable to provide a first logarithmic generator output signal proportional to the logarithm thereof, and, a second logarithmic generator coupled to receive said output of said second detector and operable to provide a second logarithmic generator output signal, where the difference between said first logarithmic generator output signal and said second logarithmic generator output signal is provided as said logarithmic output signal.

9. A demodulator according to claim 8 wherein said first logarithmic generator comprises a first current generator operable to provide a first generator current in proportion to said first input signal, and, a first forward-biased diode wherethrough said first generator current is passed, where the voltage generated across said first diode is provided as said first logarithmic generator output signal, and wherein said second logarithmic generator comprises a second current generator operable to provide a second generator current in proportion to said second input signal, and a second forward-biased diode wherethrough said second generator current is passed, where the voltage generated across said second diode is provided as said second logarithmic generator output signal.

10. A demodulator according to claim 9 wherein said first current generator comprises a first operational amplifier with said first diode coupled in the feedback path intermediately between the output of said first operational amplifier and the inverting input of said first operational amplifier, and wherein said second current generator comprises a second operational amplifier with said second diode coupled in the feedback path intermediately between the output of said second operational amplifier and the inverting input of said second operational amplifier, where said output of said first detector is coupled to said inverting input of said first operational amplifier through a first matched resistor, and where said output of said second detector is coupled to said inverting input of said second operational amplifier through a second matched resistor.

11. A demodulator according to claim 10 wherein said first diode comprises the base-collector junction of an actively-biased first logarithmic amplifier transistor, and wherein said second diode comprises the base-collector junction of an actively-biased second logarithmic amplifier transistor.

12. A demodulator according to any one of the preceding claims wherein;

said moving medium is a rotary magnetic disc having a tribit servo track recorded thereon, said transducer is a magnetic head operable to recover signals from said disc, said first position-indicating signal is the first position-indicating pulse of the tribit signal, said second position-indicating signal is the second position-indicating pulse of the tribit signal, said first detector is an amplitude detector, and said second detector is an amplitude detector.

* * * * *